May 27, 1958  J. H. CLAWSON  2,836,744
INSULATED COIL
Filed June 1, 1954
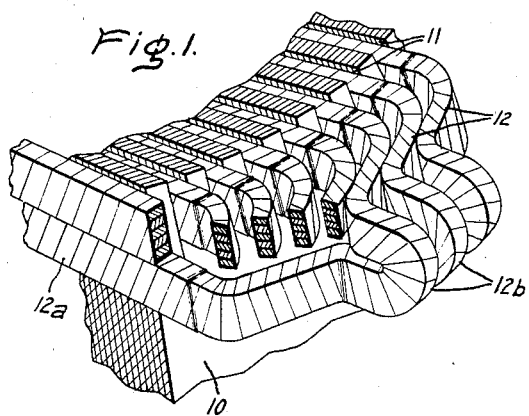
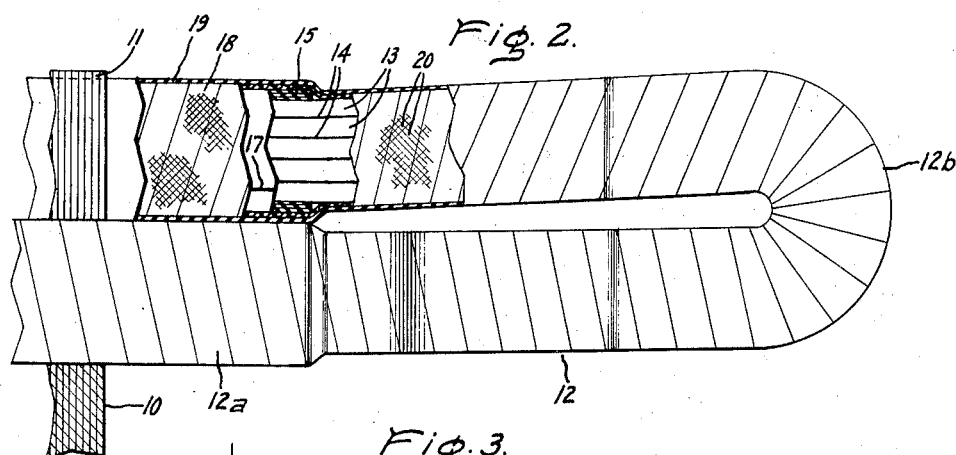
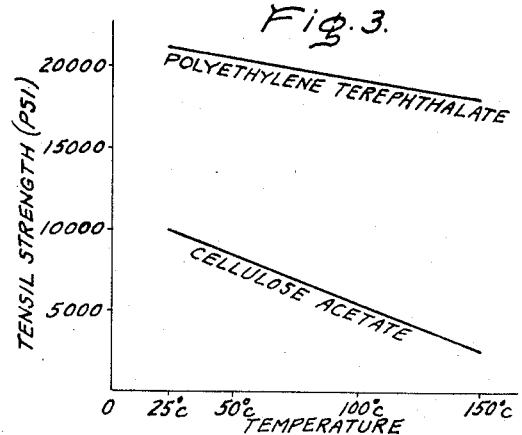
Inventor:
John H. Clawson,
by  His Attorney.

United States Patent Office 2,836,744
Patented May 27, 1958

2,836,744

INSULATED COIL

John H. Clawson, Schenectady, N. Y., assignor to General Electric Company, a corporation of New York Application June 1, 1954, Serial No. 433,497

9 Claims. (Cl. 310—208)

The present invention relates to conductor coils for use in devices such as dynamoelectric machines, and more particularly to novel means for and methods of producing a compact form wound coil which prossesses high dielectric strength and in which the thickness of the insulation required can be substantially reduced to allow a higher percentage of the cross sectional area of the structure to be used for the active materials.

In the construction of form wound electrical coils for insertion in the winding slots of the cores of dynamoelectric machines, it has been the general practice to cover the turns of the coil with insulation to insulate the turns from one another, and to cover the coil comprising a plurality of such turns with ground insulation to protect the coil from grounding and corona discharge to the stator core. This ground insulation has normally been a plurality of wrappings of varnish impregnated cloth and, since voids are left in the insulation during its application, it has been essential to provide a substantially thicker layer of ground insulation than that which the dielectric properties of the impregnated cloth would indicate to be required. Also, the insulation may be damaged or crushed, and hence rendered partially ineffective, due to high localized pressures which may be encountered during the insertion of the coil in the core, or after assembly, by such pressures resulting from forces encountered in use, as, for example, from high starting currents. To provide the necessary factor of safety which takes such considerations into account, more than one-half of the space of the winding slot has been utilized by the insulation. In addition to the effect this has upon the efficiency and the losses of the machine, thick insulation reduces the capacity of the machine in transferring heat between the winding and the magnetic core.

Accordingly, it is an object of this invention to provide a solution to the above-mentioned problems by providing a tough damage-resistant ground insulation system for a coil having a dielectric strength approaching its theoretical value.

It is another object of this invention to provide improved coils having substantially void-free insulation without impregnation.

A further object of this invention is to provide an improved method of applying a substantially void-free insulation on a conductor without impregnation.

It is another object of this invention to provide a coil in which the shrinkage of the insulation after assembly provides a high tensile load on the insulation to substantially eliminate the voids therein.

Further objects and advantages of this invention will become apparent and this invention will be better understood from the following description referring to the accompanying drawing, and the features of novelty which characterize this invention will be pointed out with particularity in the claims annexed to and forming part of this specification.

In the drawings Fig. 1 is a fragmentary sectional view of a stator core for a dynamoelectric machine embodying this invention.

Fig. 2 is an enlarged fragmentary side view of a portion of an electric coil, partially broken away, illustrating this invention.

Fig. 3 is a graph plotting tensile strength against temperature for certain insulation material suitable for use in this invention illustrating another aspect thereof.

Briefly stated, in accordance with one embodiment of this invention, an insulated coil which may consist of a single turn or a bundle of juxtaposed conductors insulatingly separated from one another, is covered with a solid continuous unsupported film which has high tensile strength and a high shrinkage rate at elevated temperatures. Several layers of this film are tightly wrapped around the portion of the coil which is to be positioned in the winding slot of a dynamoelectric machine. A porous or permeable covering, such as a woven tape, is wrapped over the layers of film, and a thick coating of varnish is applied over the fabric to seal the coil from moisture. The varnish enters the interstices between the transverse and longitudinal strands of the fabric to firmly secure the varnish to the remainder of the insulation so that any flexural forces will not cause the varnish to peel loose from the coil. Under heat the film shrinks around the coil, and its high tensile strength at high temperatures cause them to be tightly pressed against the coil to substantially eliminate any voids in the insulation. It is desirable that the porous covering have an equal or greater shrinkage so that this covering will likewise exert a compressive force on the underlying layers of insulating film to insure that there is no separation thereof.

Referring now to the drawing, there is shown in Fig. 1 a fragmentary portion of a wound core for a dynamoelectric machine such as a stator core 10 having winding slots 11 in which form wound coil 12 is positioned. It will be observed that coil 12 has a straight portion 12a positioned in winding slot 11. The portion 12a is insulated in accordance with the teaching of this invention, and it will be observed that the straight portion 12a extends beyond the end of the core 10 so that the insulation thereon extends beyond the end of the core for greater protection against the grounding of the coil and corona discharges to the core. The end turns of the coil 12b may be insulated in any suitable manner to meet the requirements of the use for which the machine is intended.

Referring now to Fig. 2, there is shown a portion of the coil which illustrates the present invention. While coil 12 is shown in Fig. 2 as having a plurality of juxtaposed turns 13, it is apparent that it could be formed of a single conducting turn. The conductors 13 are suitably separated from one another by insulation such as an enamel coating 14 and are of such configuration as to fit together in a compact unit as by being integrally molded together prior to the application of the ground insulation at 12b.

In accordance with this invention, the coil portion 12a is wrapped with a plurality of layers 15 of unsupported film which is oriented in both its transverse and longitudinal directions and possesses high tensile strength at elevated temperatures and shrinks at temperatures greatly below the flow point of the material. I have found that a film or sheet formed of a polyethylene terephthalate resin has been found to be particularly desirable. The initial end of the film 15, which as indicated in the drawing, extends over the straight coil portion 12a, is cemented to the coil 12 by suitable cement to enable the film 15 to be wrapped tightly around the coil portion 12a. The terminal end of the film 15 is likewise securely cemented to the underlying layer of the film as at 17 to prevent any unwrapping of the film. The thickness and number of laps of the film 15 utilized is dependent on the specific voltage and corona requirements of the dynamoelectric machine into which the coil is to be installed. Film having a thickness of from approximately 1 mil to 7½ mils with from approximately 2–5 laps around the coil portion 12a have been satisfactorily used in various applications. Since it is desirable in all cases to have a plurality of layers of the film material 15 for greater protection, a machine to be operated at low voltages would normally use the thinner film material and the thicker sheet would normally be used in a machine to be operated at high voltages.

Since the continuous layers of film will inherently entrap some pockets of air during its application, it is necessary to eliminate these pockets in order to increase the protection of the coil against corona discharge and to increase the dielectric strength of the insulation to substantially its theoretical value. To accomplish this, the film is heated to a temperature in the order of 100° C. to 150° C. for a short period, say 15 minutes, to shrink the film 15 tightly upon the coil portion 12a. This shrinkage may be accomplished during the final baking operation on the coil construction as hereinafter more fully described. Such heating will result in a reduction in the length of the film of polyethylene terephthalate at least 3% and 5% without substantially softening the film. Because the ends of the layers of film are tightly secured to the coil portion 12a, and due to high tensile strength and the shrinkage characteristics of the film 15, this amount of shrinkage causes the film 15 to apply a compressive force between its various layers and upon the coil portion 12a to eliminate substantially all the air pockets between the layers of sheet insulation covering the coil portion 12a to provide a substantially void-free insulation thereon. In the event that greater compressive forces are required, the polyethylene terephthalate film may be heated to higher temperatures to increase the amount of shrinkage, for example, by heating the film to 160° C. the amount of shrinkage can be increased to about 7%.

Tests of the power factor of the insulation at 4,000 volts show that the insulation is substantially void-free in that the power factor of the coil in which the ground insulation was formed of a plurality of layers of polyethylene terephthalate film shrunk 3% to 5% over the coil was 40% less than the power factor for a coil similarly insulated with varnish impregnated cotton cloth. It is to be emphasized that high tensile strength of the film at elevated temperatures and the prevention of the unwrapping of the film 15 is essential in order to obtain this void-free construction without the use of a molding or filling operation.

After the installation of layers of film 15, the coil 12 is wrapped with a porous or permeable material 18 to provide means for increasing the rigidity of the insulation system and reinforcing the film 15, and preferably, material 18 is applied in the form of a helically wound woven tape. A sealant such as a varnish coating 19 is applied over the porous material 18 and is secured to the film 15 by virtue of the fact that the permeable covering 18 provides interstices 20 between the filaments into which the varnish enters during the coating process. Because it is desirable to provide a relatively thick varnish coating 19 over the coil to seal the coil against moisture and other deleterious substances, any flexure of the coil tends to cause the varnish 19 to pull loose or separate from the coating 15. It is apparent that covering 18 provides reinforcement for the varnish coating 19 and aids in securing it to the coil 12.

While any porous material tightly wrapped about the film layers 15 may be utilized, in the preferred form of this invention the covering 18 should have a shrinkage rate at elevated temperatures equal to or greater than the shrinkage rate of the underlying layers of film 15. Accordingly, it is desirable that the covering be formed of a woven fabric in which the filaments are made of a polyethylene terephthalate or a polyacrylonitrile resin.

After the slot portion 12a of the coil is insulated as indicated above, and the end turns of the coil are suitably insulated for the intended purpose of the coil as by layers of polyacrylonitrile or polyethylene terephthalate tape, the coil is coated with a sealant 19 of any suitable insulating varnish applied in any suitable manner. For example, the sealing may be accomplished by a multiple dipping of the coil in a varnish such as an oil-modified asphalt varnish which is commonly used for such purposes. After each dip of the coil in the varnish, it is baked to cure the varnish at a temperature in the order of 135°–150° C. This heating may, if desired, also be utilized to shrink the film layers 15 and the porous layers 18 on the coil.

The polyethylene terephthalate films or fibers referred to above have a melting point in the order of 250° C. and are formed by the esterification of a polyethylene glycol and terephthalic acid or a lower diallyl esterification of terephthalic acid. Preferably, an ethylene glycol terephthalate which may be made from ethylene glycol and dimethyl terephthalate is utilized in making the insulation 15 and 18. Such materials are more fully described in U. S. Patents 2,465,319—Whinfield et al., dated March 22, 1949; 2,597,643—Izard et al., dated May 20, 1952; 2,641,592—Hofrichter, Jr., dated June 9, 1953; 2,643,989—Auspos et al., dated June 30, 1953; and 2,647,885—Billica, dated August 4, 1953.

The polyacrylonitrile resin referred to above may be a polymer of acrylonitrile or a copolymer or interpolymer with polymerizable substances such as, for example, compounds containing one or more ethylenic linkages, e. g., the vinyl pyridines, vinyl acetate, vinyl chloride, methacrylonitrile, acrylic acid and its esters and homologues such as methacrylic acid, dimethyl itaconate, methyl vinyl ketone, ethyl vinyl sulfone, styrene, isobutylene and butadiene, as well as other vinyl and acrylic compounds, other olefinic or diolefinic hydrocarbons, etc. and polymers of such substances. Reference is made to U. S. Patent 2,658,879 of Ralph G. Beaman dated November 10, 1953, for a more complete description of the type of polyacrylonitrile resin which is satisfactory for use as disclosed herein.

The graph of Fig. 3 shows the results of tests on the high tensile strength of polyethylene terephthalate films which may be used in the practice of this invention and their retention of tensile strength at temperatures of 150° C. It will be observed that in the samples of the material tested, the average tensile strength of the film at room temperature is more than 21,000 p. s. i. It will further be noted from this graph that the tensile strength of polyethylene terephthalate film at 150° C. is more than 18,000 p. s. i. which is approximately 85% of its room temperature tensile strength. As has been previously discussed, this film shrinks about 3–5% when heated to temperatures of 150° C. Because of its retention of high tensile strength at 150° C., and because the solid film may be closely wrapped about the coil with very little entrapment of air, the polyethylene terephthalate film provides a substantially void-free insulation around the coil having a dielectric strength approaching its theoretical value. For comparative purposes a similar curve for electrical grade cellulose acetate film was plotted in Fig. 3. This typical film has a tensile strength at 150° C. of approximately one-sixth the tensile strength of polyethylene terephthalate film at 150° C.

It is to be noted that the improved insulated coil or conductor made in accordance with the present invention provides a substantially void-free insulation without the need for impregnation with a filler or the application of external molding pressures to eliminate the voids therein. Moreover, a coil produced in accordance with this invention possesses a thermal stability which prevents deterioration during use. This provides a coil which retains its structural integrity at operating temperatures over long periods of time.

A further improvement obtainable by the practice of the present invention is indicated by tests which show that the toughness of the insulation in withstanding cutting or crushing is increased in the order of seven times over previously used varnish impregnated cotton cloth insulations so that thinner coatings of insulation may be utilized with an increase in coil quality.

While there has been illustrated and described particular embodiments of this invention, further modifications and improvements thereof will occur to those skilled in the art. It is to be understood, therefore, that this invention is not limited to the particular forms shown, and it is intended in the appended claims to cover all modifications which do not depart from the spirit and scope of this invention.

What I claim as new and desire to secure by Letters Patent of the United States is:

1. A form wound coil having a portion adapted to be positioned in a winding slot of a dynamoelectric machine and a covering for said portion of said coil, said covering comprising a plurality of continuous superimposed unimpregnated layers of oriented polyethylene terephthalate sheet material heated after assembly to cause said material to shrink around said coil portion to compact the layers and thereby to eliminate any air therebetween, a fibrous covering surrounding said sheet material and a sealant impregnating said fibrous covering to interlock the sealant to the remainder of said insulation.

2. An insulated coil comprising a bundle of juxtaposed conductors insulatingly separated from one another and having a portion adapted to be positioned in a winding slot of a dynamoelectric machine and a covering for said portion of said coil, said covering comprising a plurality of unimpregnated superimposed continuous layers of insulating sheet material consisting essentially of a plurality of layers of oriented polyethylene terephthalate film heated after assembly to shrink and compact the superimposed layers around said coil portion, a layer of cloth formed of polyethylene terephthalate fibers shrunk over the superimposed layers of sheet material, and a layer of sealant impregnating said cloth to tightly secure said sealant to the remainder of said insulation.

3. An insulated coil comprising a bundle of juxtaposed conductors insulatingly separated from one another and having a portion adapted to be positioned in a winding slot of a dynamoelectric machine and a covering for said portion of said coil, said covering comprising a plurality of superimposed continuous layers of unimpregnated insulating material consisting essentially of a plurality of layers of oriented polyethylene glycol terephthalate film around said coil portion, a layer of permeable material overlying said film layers, said layers being heated after assembly to compact the layers around said coil portion to provide a compressive insulating covering with the shrinkage of said permeable material being at least as great as the shrinkage of said polyethylene glycol terephthalate layers.

4. An insulated coil comprising a bundle of juxtaposed conductors insulatingly separated from one another and having a portion adapted to be positioned in a winding slot of a dynamoelectric machine and a covering for said portion of said coil, said covering comprising a plurality of superimposed continuous layers of unimpregnated insulating material consisting essentially of a plurality of layers of oriented polyethylene glycol terephthalate film around said coil portion, a layer of heat shrinkable permeable material overlying said film layers, said layers being heated after assembly to shrink the material thereof around said coil portion to provide a compressive insulating covering, the shrinkage of said permeable material being greater than the shrinkage of said polyethylene glycol terephthalate layers.

5. An insulated coil comprising a bundle of juxtaposed conductors insulatingly separated from one another and having a portion adapted to be positioned in a winding slot of a dynamoelectric machine and a covering for said portion of said coil, said covering comprising a plurality of superimposed continuous layers of unimpregnated solid sheet insulating material consisting essentially of a plurality of layers of heat shrinkable polyethylene glycol terephthalate film around said coil portion, a layer of helically wound polyethylene glycol terephthalate tape over said film layers, said coil being baked after fabrication to a temperature substantially below the fusion point of the layers of insulated material to shrink the layers to compact the same around said coil portion, thereby to remove air trapped therebetween, and a sealant impregnating said tape to cause the sealant to be interlocked to the remainder of the insulation.

6. An insulated coil comprising a bundle of juxtaposed conductors insulatingly separated from one another and having a portion adapted to be positioned in a winding slot of a dynamoelectric machine and a covering for said portion of said coil, said covering comprising a plurality of superimposed continuous layers of insulating unimpregnated sheet material consisting essentially of a plurality of layers of heat shrinkable polyethylene glycol terephthalate film around said coil portion, a layer of permeable material comprising a woven tape comprising polyacrylonitrile helically wrapped around said film layers, said polyethylene glycol terephthalate film and said polyacrylonitrile tape being heated after assembly to shrink the film and the tape around said coil portion to remove the air pockets therebetween to provide a substantially void-free insulation for said coil.

7. An insulated conductor comprising a conducting core provided with insulating covering including a plurality of superimposed continuous layers of solid sheet material and a permeable material surrounding said layers of solid sheet material, said solid sheet material being oriented polyethylene terephthalate film heated after assembly to shrink the superimposed layers around the conducting core to compact the same and to eliminate any air therebetween, and a layer of sealant surrounding and impregnating said permeable material.

8. The method of insulating an electrical coil which comprises covering the coil with a plurality of superimposed continuous layers of oriented polyethylene terephthalate material in sheet form, helically winding a layer of woven polyethylene terephthalate tape over said film layers, covering and impregnating said tape with an insulating sealant, and heating the assembled construction to cure the sealant and to shrink the layers of film and tape to compact the same to provide a compressive substantially void-free insulation on said coil.

9. An electrical conductor provided with an unimpregnated insulating covering comprising a plurality of superimposed continuous layers of solid unsupported material in sheet form wrapped about said conductor, said sheet material consisting essentially of polyethylene terephthalate, being oriented in its longitudinal and transverse direction and having a high tensile strength at 150° C. of not less than about 15,000 pounds per square inch, a permeable covering applied in the form of helically wound tape over said superimposed layers of said sheet material and a high-temperature sealant surrounding and impregnating said permeable tape, said conductor being heated after fabrication to a temperature substantially below the flow point of the sheet material to shrink said sheet material to compact the layers on said conductor thereby eliminating the air therebetween.

References Cited in the file of this patent

UNITED STATES PATENTS

| | | |
|---|---|---|
| 1,697,134 | Neely | Jan. 1, 1929 |
| 2,454,625 | Bondon | Nov. 23, 1948 |
| 2,691,694 | Young | Oct. 12, 1954 |

FOREIGN PATENTS

| | | |
|---|---|---|
| 660,910 | Great Britain | Nov. 10, 1951 |